(12) United States Patent
Saruhashi

(10) Patent No.: US 10,389,916 B2
(45) Date of Patent: Aug. 20, 2019

(54) IMAGE PROCESSING DEVICE AND METHOD FOR IMAGE PROCESSING THE SAME

(71) Applicant: Japan Display Inc., Minato-ku (JP)

(72) Inventor: Yasuo Saruhashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 13 days.

(21) Appl. No.: 15/787,762

(22) Filed: Oct. 19, 2017

(65) Prior Publication Data

US 2018/0152602 A1 May 31, 2018

(30) Foreign Application Priority Data

Nov. 25, 2016 (JP) ................................. 2016-228513

(51) Int. Cl.
*H04N 1/60* (2006.01)
*G06T 7/194* (2017.01)
*G06T 7/11* (2017.01)
*G06T 11/00* (2006.01)
*G06T 11/60* (2006.01)

(52) U.S. Cl.
CPC ............. *H04N 1/6008* (2013.01); *G06T 7/11* (2017.01); *G06T 7/194* (2017.01); *G06T 11/001* (2013.01); *G06T 11/60* (2013.01); *G06T 2207/10024* (2013.01); *G06T 2207/20021* (2013.01); *G06T 2207/30261* (2013.01)

(58) Field of Classification Search
CPC ......... H04N 1/6008; G06T 7/194; G06T 7/11; G06T 11/001

USPC .......................... 345/581, 589, 591, 592, 593
See application file for complete search history.

(56) References Cited

U.S. PATENT DOCUMENTS

| | | | |
|---|---|---|---|
| 6,476,820 B1 | 11/2002 | Harada et al. | |
| 2005/0099522 A1* | 5/2005 | Kondo | H03M 7/40 348/345 |
| 2005/0163345 A1* | 7/2005 | van den Bergen | G08B 13/19682 382/103 |
| 2005/0212950 A1* | 9/2005 | Kanai | H04N 5/23212 348/345 |

(Continued)

FOREIGN PATENT DOCUMENTS

| | | |
|---|---|---|
| JP | 10-285607 | 10/1998 |
| JP | 2009-212818 | 9/2009 |
| JP | 2015-119225 | 6/2015 |

*Primary Examiner* — Sarah Lhymn
(74) *Attorney, Agent, or Firm* — Oblon, McClelland, Maier & Neustadt, L.L.P.

(57) ABSTRACT

An image processing device including an area dividing circuit configured to divide an image into a plurality of blocks, convert input data showing the image to data including color information, allocate data including the color information into each of the blocks, and output data of the block and image data allocated to each of the blocks, a focus area judgment circuit configured to divide data of the block into a first image area and a second image area, and output the divided area data, and an area dedicated color conversion RGB value calculation circuit configured to compare the image data and the area data, in the case where the image data is included in the first image area, calculate first color conversion data from an intensity coefficient, wherein the image data includes a first value, a second value and a third value.

9 Claims, 8 Drawing Sheets

(56) References Cited

U.S. PATENT DOCUMENTS

| | | | |
|---|---|---|---|
| 2007/0273796 A1* | 11/2007 | Silverstein | G02B 5/10 348/752 |
| 2007/0273797 A1* | 11/2007 | Silverstein | G02B 13/22 348/752 |
| 2007/0273798 A1* | 11/2007 | Silverstein | G02B 13/22 348/752 |
| 2009/0189830 A1* | 7/2009 | Deering | G09G 3/02 345/1.3 |
| 2009/0226086 A1 | 9/2009 | Kasahara | |
| 2011/0255051 A1* | 10/2011 | McCabe | G02C 7/104 351/159.6 |
| 2012/0050566 A1* | 3/2012 | Cote | H04N 5/23212 348/224.1 |
| 2012/0262596 A1* | 10/2012 | Haas | H04N 5/23212 348/222.1 |
| 2013/0141693 A1* | 6/2013 | McCabe | G02C 7/104 351/159.56 |
| 2015/0049004 A1* | 2/2015 | Deering | G02B 27/0172 345/8 |
| 2015/0062389 A1* | 3/2015 | Takeuchi | H04N 5/23212 348/273 |
| 2016/0217625 A1 | 7/2016 | Oba et al. | |
| 2017/0078636 A1* | 3/2017 | Cho | H04N 1/6027 |
| 2017/0180741 A1* | 6/2017 | Ross | H04N 19/182 |
| 2017/0214907 A1* | 7/2017 | Lapstun | H04N 13/302 |
| 2017/0330529 A1* | 11/2017 | Van Mourik | H04N 5/20 |
| 2018/0063411 A1* | 3/2018 | Rivard | H04N 5/2258 |
| 2018/0084245 A1* | 3/2018 | Lapstun | G02B 27/0075 |
| 2019/0012989 A1* | 1/2019 | Deering | G02B 27/0172 |

\* cited by examiner

IMAGE PROCESSING DEVICE AND METHOD FOR IMAGE PROCESSING THE SAME

CROSS REFERENCE TO RELATED APPLICATIONS

This application is based upon and claims the benefit of priority from the prior Japanese Patent Application No. 2016-228513, filed on Nov. 25, 2016, the entire contents of which are incorporated herein by reference.

FIELD

The present invention is related to an image processing device and an image processing method of the image processing device.

BACKGROUND

In the case when there is a part of an image displayed on a screen which is to be the point of focus, focus is sometimes forcibly directed to the focus part by surrounding the focus part with a red frame or blinking the focus part. For example, in the case when an obstacle or a dangerous object exists in the operation of a car, an image of the obstacle or dangerous object can be emphasized by processing an image obtained using a vehicle mounted front or rear monitoring device or digital mirror, the image can be displayed in the vehicle display part and recognized by the driver.

For example, a plurality of bird's-eye images are generated from images photographed by cameras arranged in the vicinity of a vehicle and displayed, and furthermore, a viewpoint image is formed by joining and combining to make it easier to recognize a three-dimensional object from an upper part of the vehicle. Specifically, an image processing part alternately sets each of two bird's-eye images into a strip shape and generates a composite image including a junction area in which the strip position is set to change together with the transition of time. In this way, it becomes possible to make a driver recognize the existence of a three-dimensional object having the possibility of a collision.

SUMMARY

An image processing device related to one embodiment of the present invention includes an area dividing circuit configured to divide an image into a plurality of blocks, convert input data showing the image to data including color information, allocate data including the color information into each of the blocks, and output data of the block and image data allocated to each of the blocks, a focus area judgment circuit configured to divide data of the block into a first image area and a second image area, and output the divided area data, and an area dedicated color conversion RGB value calculation circuit configured to compare the image data and the area data, in the case where the image data is included in the first image area, calculate first color conversion data from the image data and an intensity coefficient, and in the case where the image data is included in the second image area, calculate second color conversion data from the image data, the intensity coefficient and a luminosity coefficient, wherein the image data includes a first value, a second value and a third value.

DESCRIPTION OF EMBODIMENTS

Figure 1:
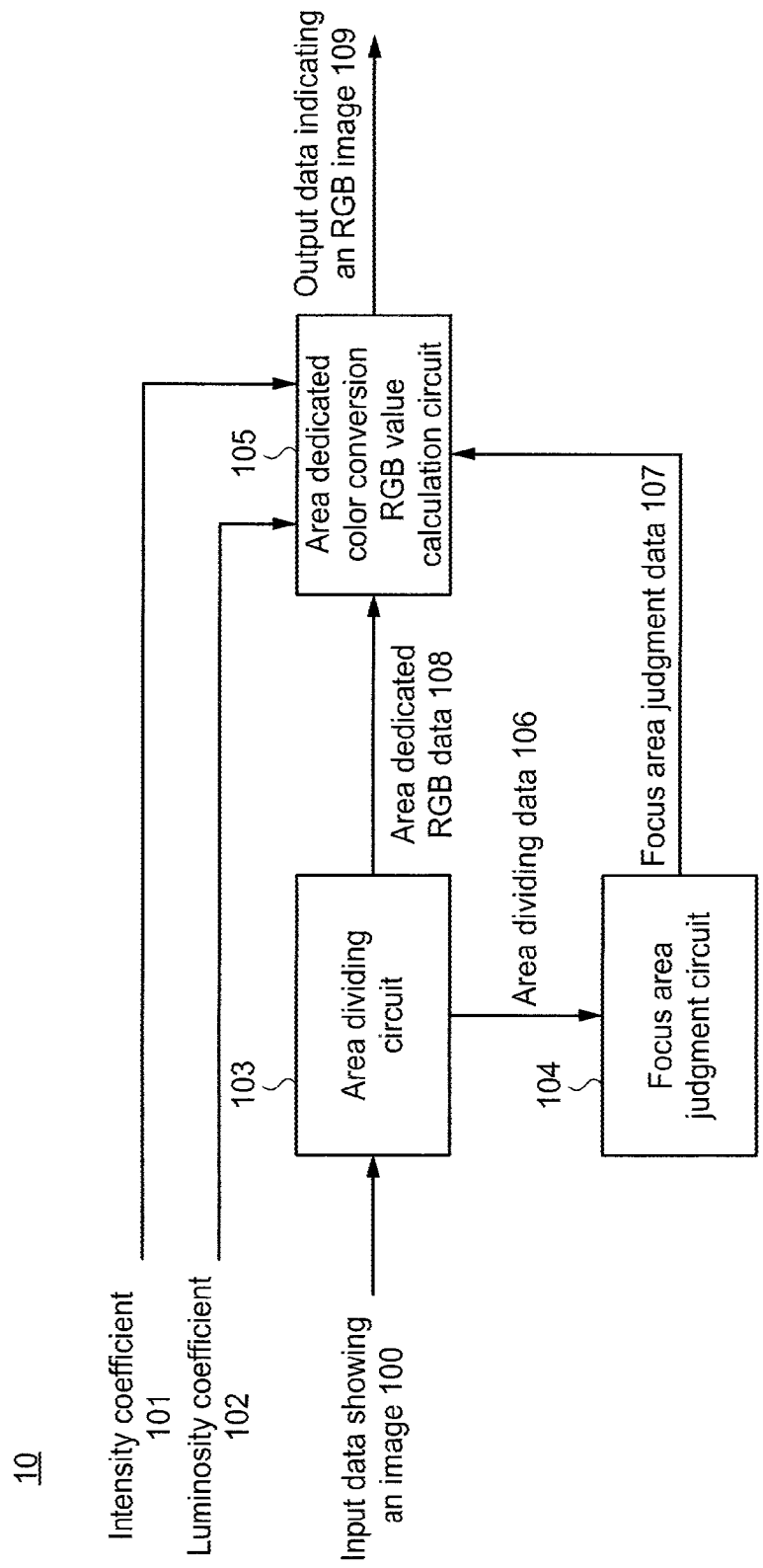
FIG. 1 is schematic diagram showing a structure of an image processing device related to one embodiment of the present invention.

Embodiments of the present invention are explained below while referring to the drawings. However, the present invention can be carried out in many different modes and is not to be interpreted as being limited to the description of the embodiments exemplified below. In addition, in order to make the explanation clearer, the structure of each part in the drawings may be schematically represented in comparison with their actual form, and are only an example and do not limit the interpretation of the present invention. Furthermore, in the specification and each figure, elements similar to those already described with reference to the preceding figures are attached with the same reference numerals (or reference numerals followed by numerals a, b, etc.) and a detailed explanation may be omitted as appropriate. Furthermore, letters added with [first] and [second] with respect to each element are convenience signs used for distinguishing each element and do not have any further meaning unless otherwise specified.

An image processing device related to one embodiment of the present invention is explained.

Generally, red color with a wavelength near 700.0 nm is regarded as an advancing color and an expanding color and blue color with a wavelength near 435.8 nm is regarded as a retreating color and a contraction color. That is, when a human sees red color, it looks closer than it actually is, or it looks bigger, and when a human sees blue color, it looks farther or looks smaller than it actually is. The image processing device related to one embodiment of the present invention utilizes this feature. That is, it is possible to provide an image processing device and an image processing method of an image processing device that emphasizes a focus area by utilizing a feature with respect to a human's perceptual recognition ability of color, by a process with less sense of discomfort to the eyes of an observer. Specifically, a focus area including the object to be focused on etc. is converted to a reddish color so as to appear close, that is, converted to a color on the longer wavelength side, and other areas are converted to a greenish color or a bluish color so as to appear further away, that is, converted to a color on the shorter wavelength side. Furthermore, the standard for converting to a color on the longer wavelength side or a color on the shorter wavelength side may be yellow with a wavelength near 570.0 nm, the standard may be determined within the red wavelength in the case when an image is reddish, and the standard may be determined within the blue wavelength in the case when an image is bluish. That is, it is possible to emphasize an area of focus by converting the area of focus to a color on the long wavelength side compared with the other areas.

First Embodiment

In the present embodiment, the structure of an image processing device related to one embodiment of the present invention is explained.

FIG. 1 is a schematic diagram showing a structure of an image processing device 10 related to one embodiment of the present invention.

The image processing device 10 is formed from an area dividing circuit 103, a focus area judgment circuit 104, and an area dedicated color conversion RGB value calculation circuit 105. The area dividing circuit 103 is electrically connected to the focus area judgement circuit 104 and the area dedicated color conversion RGB value calculation circuit 105, and the focus area judgment circuit 104 is electrically connected to the area dedicated color conversion RGB value calculation circuit 105.

The area dividing circuit 103 is input with input data showing an image 100, and outputs area dividing data 106 and area dedicated RGB data 108. The area dividing circuit 103 divides an image into a plurality of blocks and outputs the area dividing data 106 which is data of the plurality of divided blocks. In addition, the area dividing circuit 103 converts the input data showing an image 100 into image data including color information. Next, image data including color information is allocated to each of the plurality of divided blocks, and outputs area dedicated RGB data 108 which is data allocated to each of the plurality of divided blocks. By dividing an image into a plurality of blocks, the area dividing circuit 103 can be expected to facilitate subsequent processing. In addition, by converting input data showing an image 100 into image data including color information, it is possible to include image data that can be displayed on a display device. Furthermore, image data including color information may include R data indicating red, G data indicating green and B data indicating blue. In the following explanation, image data may be (R, G, B).

The focus area judgment circuit 104 is input with the area dividing data 106 and outputs focus area judgment data 107. The focus area judgment circuit 104 divides the area dividing data 106 into a focus area including a focus target and a background area other than the focus area. The focus area judgment data 107 includes a focus area and a background area. By dividing the area dividing data 106 into a focus area including a target and a background area other than the focus area of interest by the focus area judgment circuit 104, subsequent processing is facilitated.

The area dedicated color conversion RGB value calculation circuit 105 is input with area dedicated RGB data 108, focus area judgment data 107, an intensity coefficient 101 and a luminosity coefficient 102, and outputs output data showing an RGB image 109. The area dedicated color conversion RGB value calculation circuit 105 compares the area dedicated RGB data 108 with the focus area judgment data 107, and in the case when the area dedicated RGB data 108 is included in a focus area, first color conversion data is calculated from the area dedicated RGB data 108 and the intensity coefficient 101. In the case when the area dedicated RGB data 108 is included in the background area, second color conversion data is calculated from the area dedicated RGB data 108, the intensity coefficient 101 and the luminosity coefficient 102. The output data showing an RGB image 109 includes the first color conversion data and the second color conversion data. Furthermore, the intensity coefficient 101 is k and the luminosity coefficient 102 is d. The area dedicated color conversion RGB value calculation circuit 105 can divided the image data into a focus area and a background area and can intensify both the focus area and the background area respectively.

Figure 2:
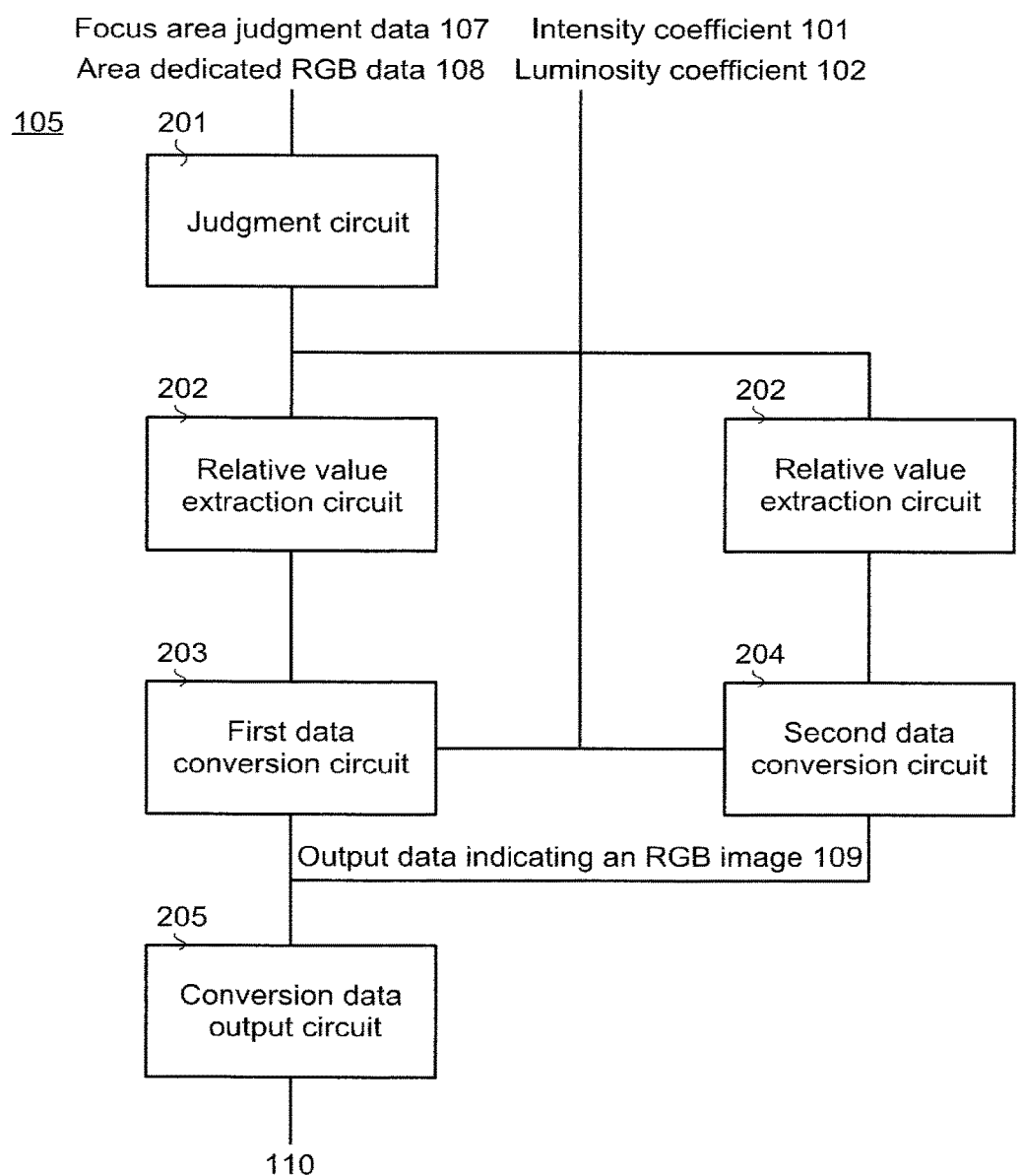
FIG. 2 is a schematic diagram showing a structure of an area dedicated color conversion RGB value calculation circuit in an image processing device related to one embodiment of the present invention.

FIG. 2 is a schematic diagram showing a structure of the area dedicated color conversion RGB value calculation circuit 105 of the image processing device 10 related to one embodiment of the present invention.

The area dedicated color conversion RGB value calculation circuit 105 is formed from a judgment circuit 201, two relative value extraction circuits 202, a first data conversion circuit 203, a second data conversion circuit 204 and a conversion data output circuit 205. The judgment circuit 201 is electrically connected to the relative value extraction circuit 202. One of the relative value extraction circuits 202 is electrically connected to the first data conversion circuit 203 and the other relative value extraction circuit 202 is electrically connected to the second data conversion circuit 204. The conversion data output circuit 205 is electrically connected to the first data conversion circuit 203 and the second data conversion circuit 204. Furthermore, the conversion data output circuit 205 may be included in the area dedicated color conversion RGB value calculation circuit 105, or is provided outside the area dedicated color conversion RGB value calculation circuit 105 and may be input with a signal output by the area dedicated color conversion RGB value calculation circuit 105.

The judgement circuit 201 correlates the area dedicated RGB data 108 with the focus area judgment data 107. That is, the judgement circuit 201 judges whether the area dedicated RGB data 108 is included in the focus area or the background area and correlates the area dedicated RGB data 108 with each area. By correlating the area dedicated RGB data 108 with each area, it is possible to facilitate subsequent intensity processing of the focus area and the background area respectively.

The relative value extraction circuit 202 is input with data in which area dedicated RGB data 108 is correlated with a focus area or a background area. The relative value extraction circuit 202 can extract the maximum value among R data indicating red, G data indicating green and B data indicating blue which are data including color information in the area dedicated RGB data 108. That is, the relative value extraction circuit 202 can decide the color to be most emphasized among R, G, B and can facilitate the subsequent intensity process of the focus area and background area respectively.

Figure 7:
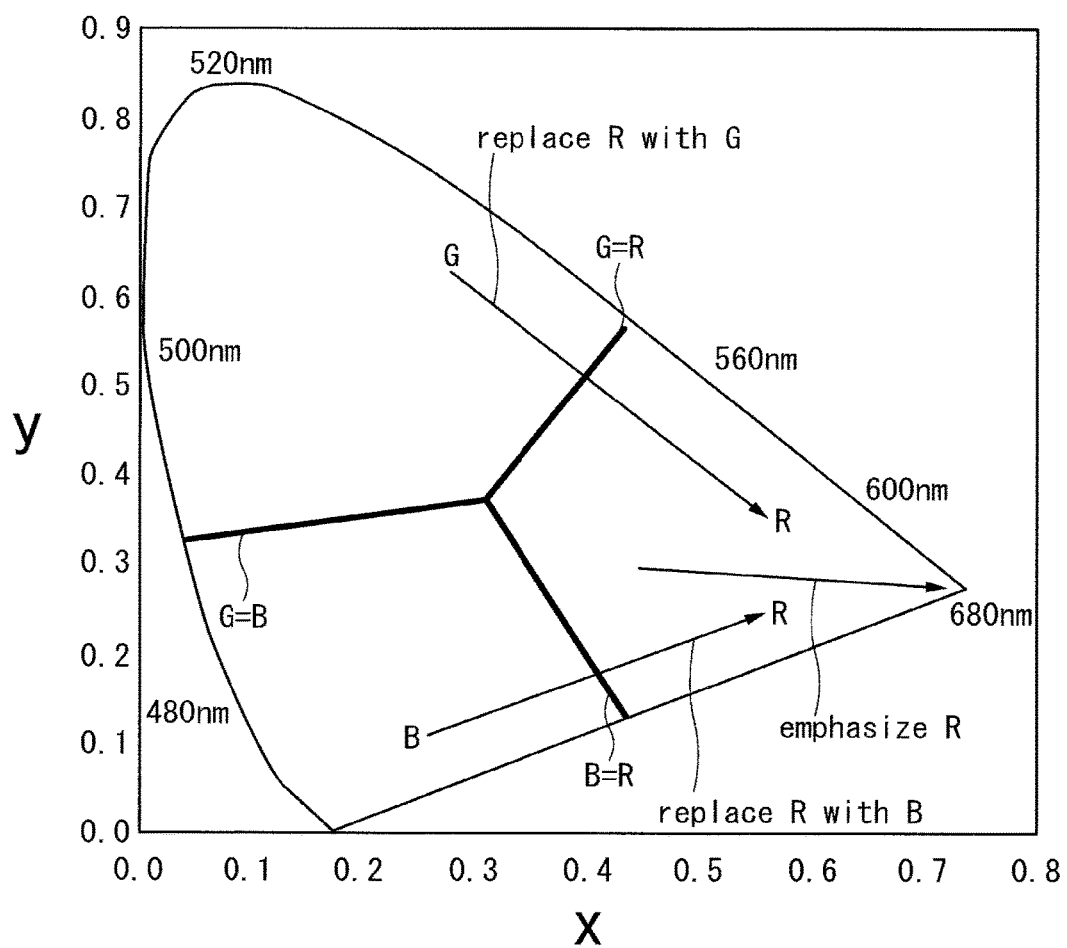
FIG. 7 is an xy chromaticity diagram for explaining color data conversion of a focus area related to one embodiment of the present invention.

The first data conversion circuit 203 is input with a maximum value extracted by one of the relative value extraction circuits 202 and k which is an intensity coefficient. In the case when a maximum value is R data, the R data is multiplied by k to obtain kR. G data and B data are not processed. Then, image data (kR, G, B) is output. In the case when a maximum value is G data, R data is replaced with G data. B data is not processed. Then, image data (G, R, B) is output. In the case when a maximum value is B data, R data is replaced with B data. G data is not processed. Then, image data (B, G, R) is output. The first data conversion circuit 203 can further intensify red. In other words, the focus area can be emphasized further by setting the focus area to a color on the longer wavelength side. Here, replacing data means replacing chromaticity coordinates in the xy chromaticity diagram shown in FIG. 7. For example, in the case when the coordinates in the chromaticity diagram are given as (x, y), and the coordinates of R are (x1, y1) and the coordinates of G are (x2, y2), replacing the R data with G data means setting R (x2, y2) and G (x1, y1) with respect to G=R (straight line having the same xy coordinates of G and R) shown in FIG. 7.

Figure 8:
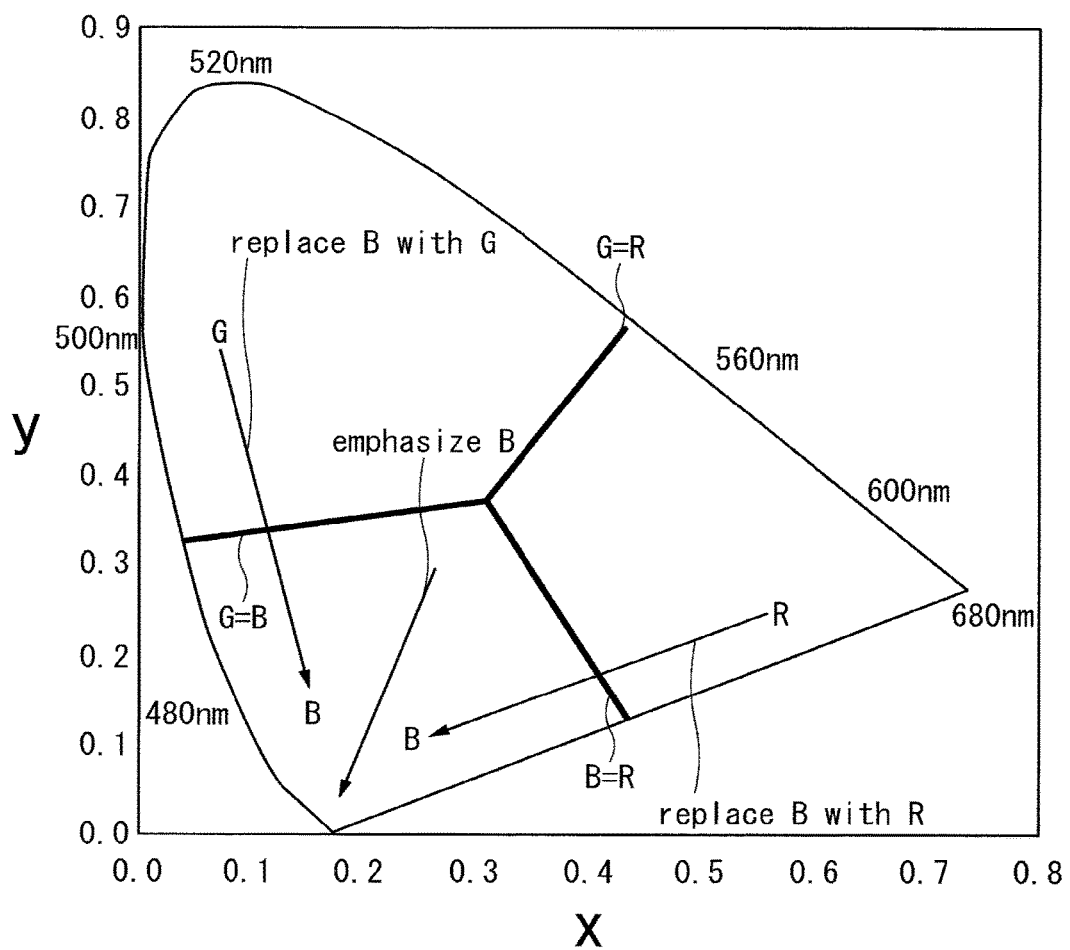
FIG. 8 is an xy chromaticity diagram for explaining color data conversion of a background area related to one embodiment of the present invention.

The second data conversion circuit 204 is input with a maximum value extracted by the other relative value extraction circuit 202, k which is the intensity coefficient and d which is the luminosity coefficient. In the case when a maximum value is R data, R data is replaced with B data. After that, B data, G data, and R data are each multiplied respectively by d to obtain dB, dG and dR. Then, image data (dB, dG, dR) is output. In the case when a maximum value is G data, G data is replaced with B data. After that, R data, B data and G data are multiplied by d to obtain dR, dB, and dG. Then, image data (dR, dB, dG) is output. In the case when a maximum value is B data, B data is multiplied by k to obtain kB. R data and G data are multiplied by d respectively to obtain dR, dG. Then, image data (dR, dG, kB) is output. The second data conversion circuit 204 can further intensify blue color. In other words, it can be expected that areas other than a focus area is further emphasized by setting areas other than a focus area to a color on the short wavelength side. Here, replacing data means replacing chromaticity coordinates in the xy chromaticity diagram shown in FIG. 7. For example, in the case when the coordinates in the chromaticity diagram are given as (x, y), and the coordinates of G are (x1, y1) and the coordinates of B are (x2, y2), replacing the G data with B data means setting G (x2, y2) and B (x1, y1) with respect to G=B (straight line having the same xy coordinates of G and B) shown in FIG. 8.

The conversion data output circuit 205 is input with image data output by the first data conversion circuit 203 and the second data conversion circuit 204 and outputs a conversion data 110. The conversion data output circuit 205 collectively outputs the input image data. Here, although an example is shown in which the conversion data output circuit 205 is included in the area dedicated color conversion RGB value calculation circuit 105, a structure is also possible in which it is outside the area dedicated color conversion RGB value calculation circuit 105 and in which it may be input with a signal output by the area dedicated color conversion RGB value calculation circuit 105. The conversion data output circuit 205 can collect data divided into the data which intensifies a focus area and data of other areas and can send the data to an external device such as a display as image data.

Furthermore, the area dedicated color conversion RGB value calculation circuit 105 may include a storage device. The storage device can temporarily store image data in advance. The storage device may be, for example, an SRAM (Static Random Access Memory), a DRAM (Dynamic Random Access Memory) or a flash memory. Any circuit can be used as long as it can store data. Specifically, for example, when the conversion data output circuit 205 collects image data, the image data output by the first data conversion circuit 203 and the data output by the second data conversion circuit 204 are temporarily stored in the storage device, and the stored data is read by moving the stored data from the storage device to a register or a latch circuit and controlling the register or latch circuit so that the transfer time of each data becomes uniform.

Here, the image processing device 10 may include a processor and a storage device. Processing and execution in each circuit may be performed so that the processor reads a program from the storage device, executes processing, moves the processed data and the program and the like to the storage device and stores them. In addition, the processor may read out programs and data and the like from the storage device and continue processing.

By using the image processing device as described above, it is possible to convert a focus area to reddish image data on the long wavelength side, it is possible to convert a background area to bluish image data on the shorter wavelength side, and it is possible to intensify a focus area by utilizing the difference in wavelengths. For example, by displaying image data processed by the in-vehicle display device and the image processing device related to one embodiment of the present invention on the in-vehicle display device, although it is possible to emphasize a walking person, an animal, a dangerous object such as another travelling vehicle or the like and the focus object compared with the other background areas, it can be less uncomfortable to the human eye, and the driver can pay attention to the focus area while being able to reduce the neglect of attention to the background other than the focus part and therefore safe driving becomes possible.

Second Embodiment

In the present embodiment, an image processing method related to one embodiment of the present invention is explained. Furthermore, explanations of the same structure as in the first embodiment may be omitted.

Figure 3:
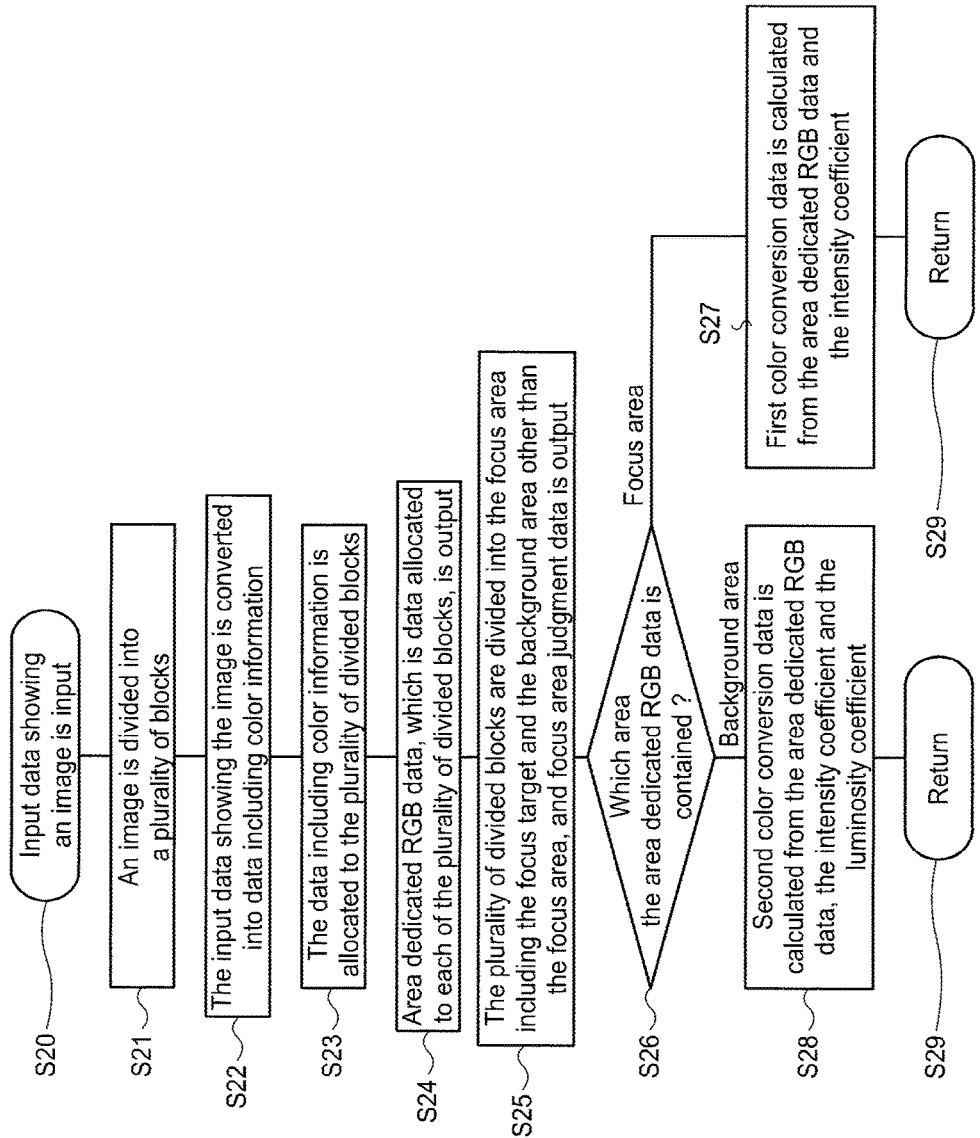
FIG. 3 is a diagram showing a flowchart for explaining an image to processing method of an image processing device related to one embodiment of the present invention.

FIG. 3 is a flowchart for explaining an image processing method of the image processing device 10 related to one embodiment of the present invention.

Input data showing an image 100 is input to the image processing device 10 (step 20 (S20)). An image is divided into a plurality of blocks, and area dividing data 106 which is data of a plurality of divided blocks is output (step 21 (S21)). Next, the input data showing the image 100 is converted into data including color information (step 22 (S22)). Furthermore, the data including color information is allocated to the plurality of divided blocks (step 23 (S23)). Next, area dedicated RGB data 108, which is data allocated to each of the plurality of divided blocks, is output (step 24 (S24)). The operations up to this point are performed by the area dividing circuit 103.

Next, area division data 106 is input to the focus area judgment circuit 104, the plurality of divided blocks are divided into the focus area including the focus target and the background area other than the focus area, and focus area judgment data 107 is output (step 25 (S25)).

Furthermore, area dedicated RGB data 108, focus area judgment data 107, intensity coefficient 101 and luminosity coefficient 102 are input to the area dedicated color conversion RGB value calculation circuit 105. The area dedicated color conversion RGB value calculation circuit 105 compares the area dedicated RGB data 108 with the focus area judgment data 107, and judges whether the area dedicated RGB data 108 is included in the focus area or the background area (step 26 (S26)).

In the case where area dedicated RGB data 108 and focus area judgement data 107 are compared and the area dedicated RGB data 108 is included in the focus area, first color conversion data is calculated from the area dedicated RGB data 108 and the intensity coefficient 101 (step 27 (S27)).

In the case where area dedicated RGB data 108 and focus area judgement data 107 are compared and the area dedicated RGB data 108 is included in the background area, second color conversion data is calculated from the area dedicated RGB data 108, the intensity coefficient 101 and the luminosity coefficient 102 (step 28 (S28)).

Lastly, the first color conversion data and the second color conversion data are input to the conversion data output circuit 205, and the conversion data 110 is output (step 29 (S29)). Furthermore, the conversion data 110 may be output data showing an RGB image 109. The intensity coefficient 101 is k and the luminosity coefficient 102 is d.

According to the image processing method related to the present embodiment, an image is divided into a plurality of blocks, image data including color information is allocated to each block, a focus image is determined, and the focus image is processed by utilizing the intensity coefficient and the luminosity coefficient. Thereby it is possible to emphasize a focus area by utilizing the difference in wavelengths. The image processing method related to the present embodiment can be applied to the image processing device shown in the first embodiment.

Third Embodiment

In the present embodiment, an image processing method including a process for extracting a maximum value from image data in the image processing device related to one embodiment of the present invention is explained. Furthermore, explanations of structures similar to those of the first embodiment and the second embodiment may be omitted.

Figure 4:
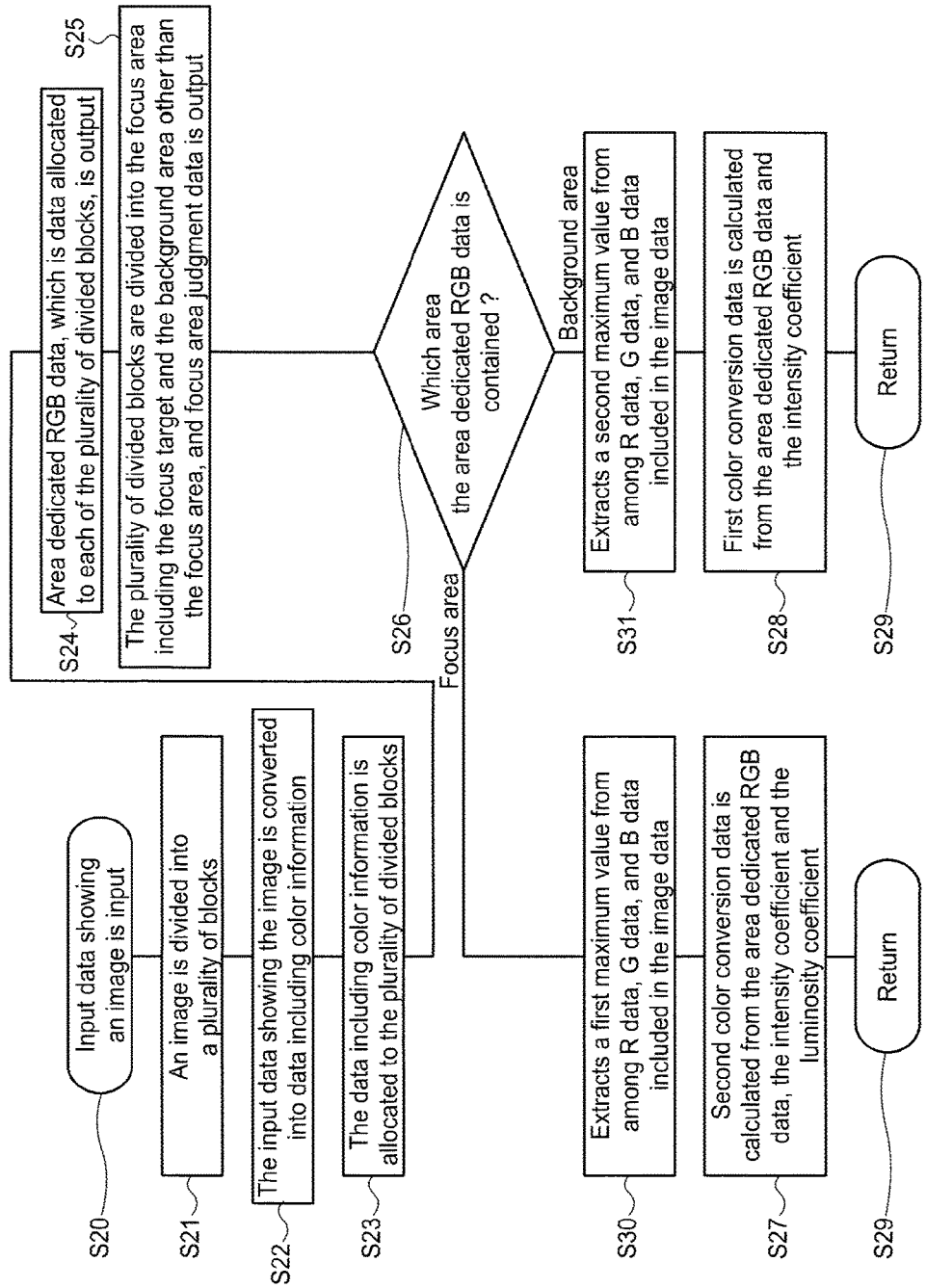
FIG. 4 is a diagram showing a flowchart for explaining a processing method in the case where the image processing device related to one embodiment of the present invention includes a judgment circuit and a maximum value extraction circuit.

FIG. 4 is a flowchart for explaining a processing method in the case where the image processing device 10 related to one embodiment of the present invention includes a judgement circuit and a maximum value extraction circuit.

In the case where the area dedicated RGB data 108 is correlated with a focus area via steps 20 (S20), 21 (S21), 22 (S22), 23 (S23), 24 (S24), 25 (S25) and 26 (26), one of the relative value extraction circuits extracts a maximum value from among R data indicating red, G data indicating green, and B data indicating blue, and R, G and B data are output (step 30 (S30)). In addition, in the case where the area dedicated RGB data 108 is correlated to a background area, the other relative value extraction circuit extracts a maximum value from among R data indicating red, G data indicating green and B data indicating blue, and R, G, and B data are output (step 31 (S31)). In this way, it is possible to emphasize the extracted maximum value.

Next, the first color conversion data and the second color conversion data are input to the conversion data output circuit 205 via step 27 (S27) and step 28 (S28), and the conversion data 110 is output (step 29 (S29)). Furthermore, the conversion data 110 may also be output data showing an RGB image 109.

According to the image processing method related to the present embodiment, dividing a focus area and a background area, extracting a maximum value among image data correlated to the focus area and extracting a maximum value from image data correlated to a background area, and it is possible to emphasize the respective extracted maximum value. Therefore, it is possible to emphasize the focus area by utilizing the difference between the respective maximum values. Furthermore, the image processing method related to the present embodiment can be applied to the image processing device shown in the first embodiment.

Fourth Embodiment

In the present embodiment, after extracting the maximum value in image data in the image processing device related to one embodiment of the present invention, an image processing method including a process of intensifying a maximum value is explained. Furthermore, explanations of the same structures as those of the first to third embodiments may be omitted.

Figure 5:
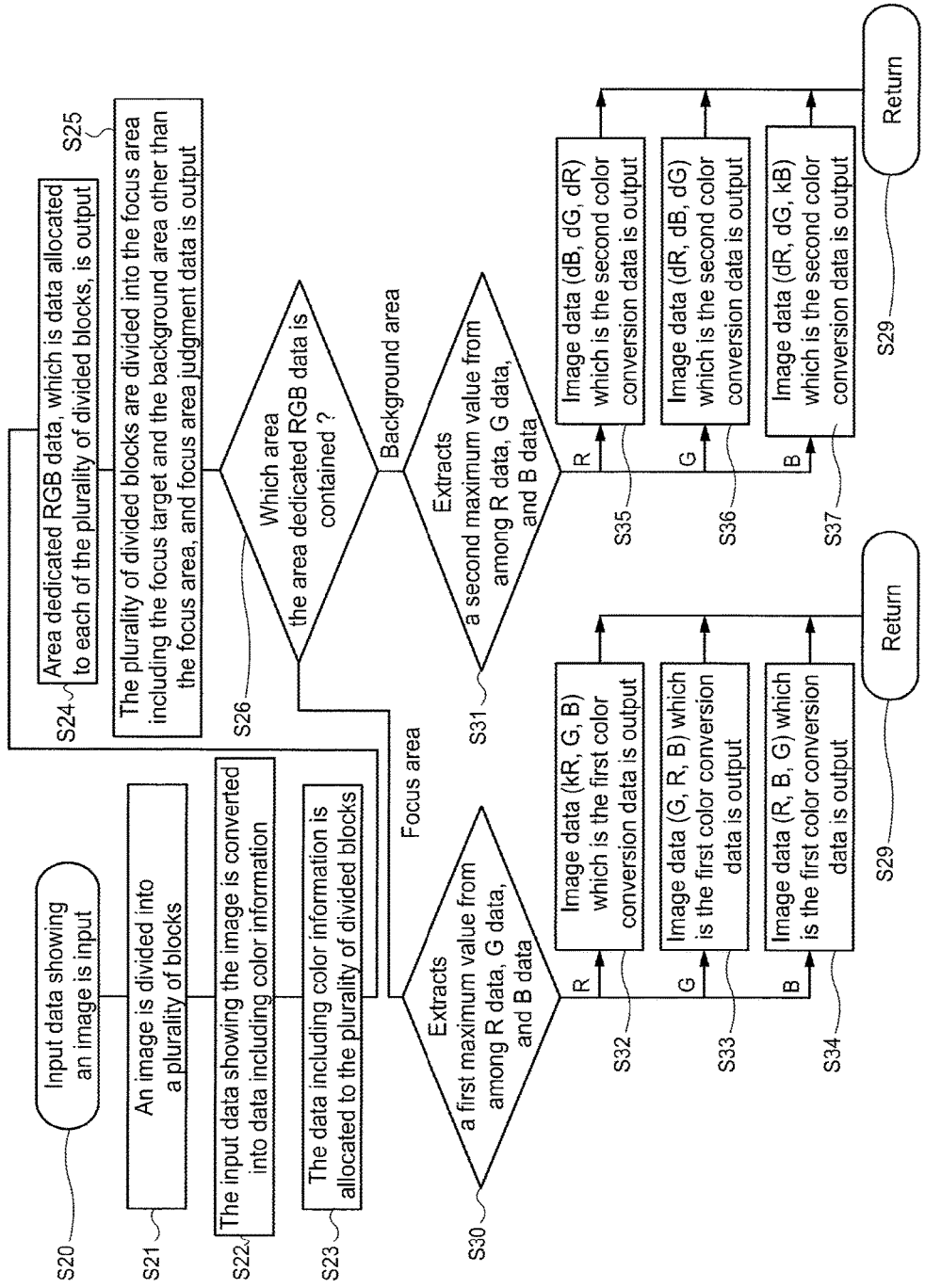
FIG. 5 is a diagram showing a flowchart for explaining a processing method in the case where the image processing device related to one embodiment of the present invention includes a first data conversion circuit and a second data conversion circuit.

FIG. 5 is a flowchart for explaining a processing method in the case where the image processing device 10 related to one embodiment of the present invention includes a first data conversion circuit and a second data conversion circuit.

After passing through steps 20 (S20), 21 (S21), 22 (S22), 23 (S23), 24 (S24), 25 (S25), 26 (S26) and 30 (S30), a maximum value extracted by one relative value extraction circuit 202 and an intensity coefficient k are input to the first data conversion circuit 203. In the case of when the maximum value is R data among R data indicating red, G data indicating green and B data indicating blue, R data is multiplied by k and converted to kR. G data and B data are not processed. Then, image data (kR, G, B) which is the first color conversion data is output (step 32 (S32)). In the case when the maximum value is G data, R data is replaced with G data, and B data is not processed. Then, image data (G, R, B) is output (step 33 (S33)). In the case when the maximum value is B data, R data is replaced with B data, and G data is not processed. Then, image data (B, G, R) is output (step 34 (S34)). In this way, the first data conversion circuit 203 can further intensify red. That is, the focus area can be emphasized further by setting a focus area to a color on the longer wavelength side. Here, replacing data means replacing chromaticity coordinates in the xy chromaticity diagram shown in FIG. 7. For example, in the case when the coordinates in the chromaticity diagram are given as (x, y), and the coordinates of R are (x1, y1) and the coordinates of G are (x2, y2), replacing the R data with G data means setting R (x2, y2) and G (x1, y1) with respect to G=R (straight line having the same xy coordinates of G and R) shown in FIG. 7.

After passing through steps 20 (S20), 21 (S21), 22 (S22), 23 (S23), 24 (S24), 25 (S25), 26 (S26) and 30 (S30), the second data conversion circuit 204 is input with a maximum value extracted by the other relative value extraction circuit 202, k which is the intensity coefficient, and d which is the luminosity coefficient. In the case when the maximum value is R data among R data indicating red, G data indicating green and B data indicating blue, R data is replaced with B data, and after that B data, G data and R data are each multiplied by d respectively. Then, image data (dB, dG, dR) which is the second color conversion data is output (step 35 (S35)). In the case when the maximum value is G data, G data is replaced with B data, and after that R data, B data G data are each multiplied by d respectively. Then, image data (dR, dB, dG) which is the second color conversion data is output (step 36 (S36)). In the case of when the maximum value is B data, B data is multiplied by k. R data and G data are multiplied by d respectively. Then, image data (dR, dG, kB) which is the second color conversion data is output (step 37 (S37)). The second data conversion circuit 204 can further intensify blue color. In other words, it can be expected that the area other than the focus area will be further emphasized, by setting the area other than the focus area to a color on the short wavelength side. Furthermore, replacing the data means replacing the chromaticity coordinates in the xy chromaticity diagram shown in FIG. 7. For example, in the case when the coordinates in the chromaticity diagram are given as (x, y), and the coordinates of G are (x1, y1) and the coordinates of B are (x2, y2), replacing the G data with B data means setting G (x2, y2) and B (x1, y1) with respect to G=B (straight line having the same xy coordinates of G and B) shown in FIG. 8.

Next, the first color conversion data and the second color conversion data are input to the conversion data output circuit 205, and conversion data 110 is output (step 29 (S29)). Furthermore, the conversion data 110 may be output data showing an RGB image 109.

According to the image processing method related to the present embodiment, by dividing a focus area and a background area, it is possible to convert the focus area to a reddish color on the long wavelength side, and it is possible to convert the background area to a bluish color on the short wavelength side. In this way, when a human views an image, it is possible to intensify a focus area than a background area by showing the focus area close and by showing the background area far away, by using the fact that red with a long wavelength appears close and blue with a short wavelength appears far away. Furthermore, the image processing method related to the present embodiment can be applied to the image processing device shown in the first embodiment.

Here, the image processing device 10 may include a processor, a calculation circuit and a storage device, each data may be moved to a storage device and stored after each step is completed. In addition, each data may be moved from the storage device and processed after each step starts. It may be programmed to process each step, store data in a storage device after each processing, and transfer the data from the storage device and process it after starting each process, and a program that is executed and read from the storage device to the processor.

By executing the processing of the image processing device as described above, it is possible to convert a focus area to reddish image data on the long wavelength side, convert a background area to bluish image data on the short wavelength side, and it is able to provide image data with an intensified focus area by utilizing the difference in wavelengths. For example, in the case when processing is executed by an in-vehicle display device and the image processing device according to one embodiment of the present invention, by the image data displayed on the in-vehicle display device, a driver of the vehicle can confirm the image that a dangerous object or a focus object are emphasized compared with the background area. In addition, since the image data which has been processed by the image processing device as described above can make it feel less uncomfortable to the human eye, the driver of the car can pay attention to the focus area while being able to reduce the neglect of attention to the background other than the focus part.

Furthermore, in the fourth embodiment, although an example is shown in which the focus area is intensified by utilizing the difference between the wavelengths of red and blue or green with the wavelength of 570 nm which is yellow as a reference, the method for emphasizing the focus area is not limited to this method. As another example, an emphasized area may be converted to a reddish color and the background area to a greenish color by utilizing the difference between green and red wavelengths. Alternatively, the emphasized area may be converted to a greenish color and the background area to a bluish color by utilizing the difference between the wavelengths of blue and green. That is, in the case when a reference wavelength is set, the focus area may be converted to a longer wavelength side than the reference, and the background area may be converted to a shorter wavelength side than the reference. By executing the processing of the image processing device as described above, in the case when a person views an image, it is possible to make the focus area feel close and the background area far away, and provide image data with an intensified focus area.

Fifth Embodiment

In the present embodiment, a processing method of the area dedicated based color conversion RGB value calculation circuit of the image processing device related to one embodiment of the present invention is explained. Furthermore, explanations of structures similar to those of the first to fourth embodiments may be omitted.

Figure 6:
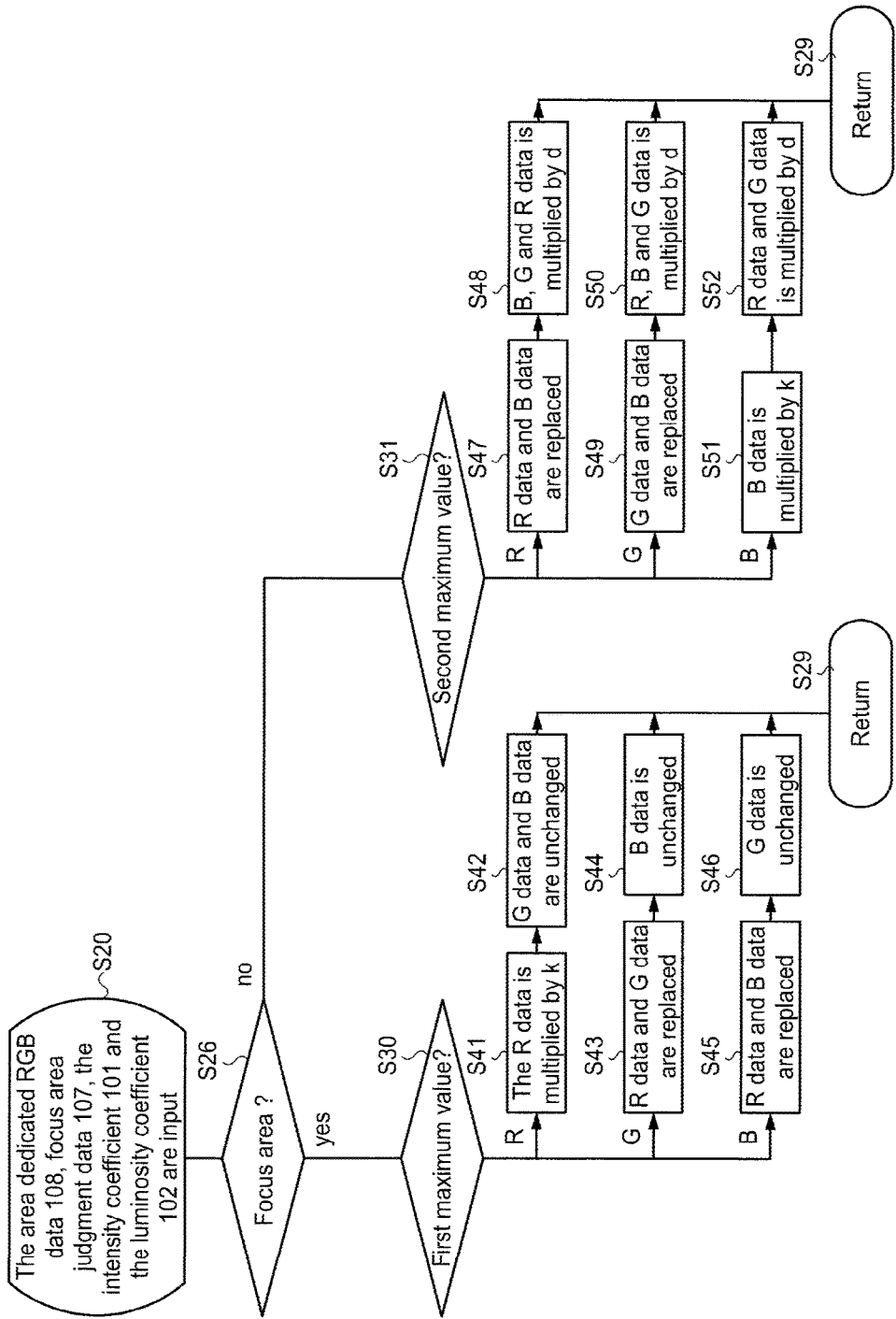
FIG. 6 is a diagram showing a flowchart for explaining a processing method of an area dedicated color conversion RGB value calculation circuit in an image processing device related to one embodiment of the present invention.

FIG. 6 is a flowchart for explaining a processing method of the area dedicated color conversion RGB value calculation circuit related to one embodiment of the present invention.

The area dedicated RGB data 108, focus area judgment data 107, the intensity coefficient 101 and the luminosity coefficient 102 are input to the area dedicated color conversion RGB value calculation circuit 105 (step 40 (S40)). It is determined whether the area dedicated RGB data 108 is included in the focus area or the background (step 26 (S26)). A step (step 30 (S30)) of extracting a maximum value in the case where the area dedicated RGB data 108 is correlated with the focus area, and a step (step 31 (S31)) of extracting a maximum value in the case where the area dedicated RGB data 108 is correlated with the background area, are carried out.

Next, in the case where the maximum value extracted in step 30 is R data, the R data is input to a calculation circuit, multiplied by k by the calculation circuit and data which becomes kR is output (step 41 (S41)). In addition, G data and B data are input to the calculation circuit but are not processed by the calculation circuit and are output unchanged (step 42 (S42)). Furthermore, G data and B data may be output without being input to the calculation circuit. The image data (kR, G, B) which is the first color conversion data is input to the conversion data output circuit 205 and conversion data 110 is output (step 29 (S29)). Furthermore, the conversion data 110 may be output data showing an RGB image 109. In FIG. 6, although it is described that S42 is executed after S41, they may also be executed in parallel. That is, R, G, B data are input in parallel to the calculation circuit, R data which is the maximum value is multiplied by k, G data and B data are not processed, and kR, G data and B data may be output in parallel.

In the case where the maximum value extracted in step 30 is G data, R data and G data are input to the calculation circuit, and R data and G data are replaced is output (step 43 (S43)). In addition, although B data is input to the calculation circuit, it is output without being processed by the calculation circuit (step 44 (S44)). Furthermore, B data may be output unchanged without being input to the calculation circuit. The image data (G, R, B) which is first color conversion data is input to the conversion data output circuit 205 and conversion data 110 is output (step 29 (S29)). Furthermore, conversion data 110 may also be output data showing an RGB image 109. In FIG. 6, although it is described that S44 is executed after S43, they may also be executed in parallel. That is, R, G, B data of are input in parallel to the calculation circuit, G data which is the maximum value and R data are replaced, B data is not subjected to calculation processing, and G, R, B data may be outputted in parallel.

In the case where the maximum value extracted in step 30 is B data, R data and B data are input to the calculation circuit, and R data and B data are replaced is output (step 45 (S45)). G data is input to the calculation circuit but is not processed by the calculation circuit and is output unchanged (step 46 (S46)). Furthermore, G data may be output as it is without being input to the calculation circuit. Image data (B, G, to R) which is the first color conversion data is input to the conversion data output circuit 205 and conversion data 110 is output (step 29 (S29)). Furthermore, the conversion data 110 may be output data showing an RGB image 109. In FIG. 6, although it is described that S46 is executed after S45, they may also be executed in parallel. That is, R, G, B data are input in parallel to the calculation circuit, B data which is the maximum value and R data are exchanged, G data is not processed and B, G, R data may be outputted in parallel.

Next, in the case where the maximum value extracted in step 31 is R data, R data and B data are input to the calculation circuit, and R data and B data are replaced is output (step 47 (S47)). Furthermore, B, G and R data are input to the calculation circuit, multiplied by the luminosity coefficient d, and output (step 48 (S48)). Image data (dB, dG, dR) which is second color conversion data is input to the conversion data output circuit 205 and conversion data 110 is output (step 29 (S29)). Furthermore, the conversion data 110 may be output data showing an RGB image 109. In FIG. 6, although it is described that S48 is executed after S47, R, G, B data may be input in parallel to a plurality of calculation circuits and dB, dG, dR data may be output in parallel.

In the case when the maximum value extracted in step 31 is G data, G data and B data are input to the calculation circuit, and G data and B data are is output (step 49 (S49)). Furthermore, R, B, G data is input to the calculation circuit, multiplied by the luminosity coefficient d, and output (step 50 (S50)). The image data (dR, dB, dG) which is the second color conversion data is input to the conversion data output circuit 205 and conversion data 110 is output (step 29 (S29)). Furthermore, the conversion data 110 may be output data showing an RGB image 109. In FIG. 6, although it is described that S50 is executed after S49, R, G, and B data may be input in parallel to a plurality of calculation circuits, and dR, dB, and dG data may be output in parallel.

In the case where the maximum value extracted in step 31 is B data, B data is input to the calculation circuit, multiplied by k by the calculation circuit and data which becomes kB is output (step 51 (S51)). In addition, R data and G data are multiplied by d by the calculation circuit, and dR, dG data is output (step 52 (S52)). Image data (dR, dG, kB) which is the second color conversion data is input to the conversion data output circuit 205 and conversion data 110 is output (step 29 (S29)). Furthermore, the conversion data 110 may be output data showing an RGB image 109. In FIG. 6, although it is described that S52 is executed after S51, R, G, B data are input in parallel to the calculation circuit, B is multiplied by k, R and G are each multiplied by d, and dR, dG, kB data may be output in parallel.

In this way, the first data conversion circuit 203 can further emphasize red. The second data conversion circuit 204 can further emphasize blue. That is, it may be expected that the focus area can be further emphasized by setting the focus area to a color on the long wavelength side and the background area to a color on the short wavelength side. Furthermore, replacing data means replacing the chromaticity coordinates in the xy chromaticity diagram shown in FIG. 7. For example, in the case when the coordinates in the chromaticity diagram are given as (x, y), and the coordinates of R are (x1, y1) and the coordinates of G are (x2, y2), replacing the R data with G data means setting R (x2, y2) and G (x1, y1) with respect to G=R (straight line having the same xy coordinates of G and R) shown in FIG. 7. In addition, replacing data means replacing the chromaticity coordinates in the xy chromaticity diagram shown in FIG. 8. For example, in the case when the coordinates in the chromaticity diagram are given as (x, y), and the coordinates of G are (x1, y1) and the coordinates of B are (x2, y2), replacing the G data with B data means setting G (x2, y2) and B (x1, y1) with respect to G=B (straight line having the same xy coordinates of G and B) shown in FIG. 8.

By carrying out the processing method of the area dedicated color conversion RGB value calculation circuit as described above, it is possible to convert a focus area to reddish image data on the long wavelength side, convert a background area to bluish image data on the short wavelength side, and provide image data in which the focus area is emphasized by utilizing the difference in wavelengths.

Each embodiment described as embodiments of the present invention above can be implemented by appropriate combination as long as there is no mutual contradiction.

Although an image processing device has mainly been exemplified as a disclosed example in the present specification, as a display device for displaying image data processed by the image processing device, other self-emission type display devices, liquid crystal display devices, and electronic paper type display device having electrophoretic elements and the like, and any flat panel type display device can be used. In addition, it is apparent that the size of the display device is not limited, and the embodiment can be applied to display devices having any size from medium to large.

Even if there are other actions and effects different from the actions and effects brought about by the forms of each embodiment described, they are obvious from the description of the present specification or those that be easily predicted by a person ordinarily skilled in the art could are naturally to be understood as being provided by the present invention.

What is claimed is:

1. An image processing device comprising:
   an area dividing circuit
   a focus area judgment circuit connected to the area dividing circuit
   an area dedicated color conversion RGB value calculation circuit connected to both the area dividing circuit and the focus area judgment circuit and
   a display device,
   wherein
   the area dividing circuit is configured
   to input data showing an image, to divide the image into a plurality of blocks,
   to convert the input data showing the image to image data including color information of image data indicating red, image data indicating green and image data indicating blue,
   to allocate the image data including the color information into each of the blocks,
   to output data of the blocks as area dividing data, and to output the image data including the color information allocated to each of the blocks as area dedicated RGB data;

the focus area judgment circuit is configured
to input the area dividing data from the area dividing circuit,
to divide data of the blocks into a first image area and a second image area, and
to output the divided area data including the first image area and the second image area as focus area judgment data, the area dedicated color conversion RGB value calculation circuit configured
to input the area dedicated RGB data from the area dividing circuit,
to input the focus area judgment data from the focus area judgment circuit,
to compare the area dedicated RGB data and the focus area judgment data,
in the case where the area dedicated RGB data is included in the first image area, to calculate first color conversion data obtained by converting the area dedicated RGB data included in the first image area into image data emphasizing a color of a long wavelength from the area dedicated RGB data and an intensity coefficient to emphasize color, and
in the case where the area dedicated RGB data is included in the second image area, to calculate second color conversion data obtained by converting the area dedicated RGB data included in the second image area into image data emphasizing a color of a short wavelength from the area dedicated RGB data, the intensity coefficient and a luminosity coefficient, and
to output data showing an RGB image including the first color conversion data and the second color conversion data; and the display device is configured
to input the output data showing an RGB image from the area dedicated color conversion RGB value calculation circuit, and
to display an image in which tone of the first image area is enhanced more than tone of the second image area.

2. The image processing device according to claim 1, wherein the area dedicated color conversion RGB value calculation circuit has a judgement circuit configured to judge whether or not the area dedicated RGB data is included in either the first image area or the second image area.

3. The image processing device according to claim 1, wherein the area dedicated color conversion RGB value calculation circuit includes a relative value extraction circuit configured to extract a value of image data showing the highest luminosity from among a value of the image data indicating red, a value of the image data indicating green and a value of the image data indicating blue.

4. The image processing device according to claim 2, wherein the area dedicated color conversion RGB value calculation circuit further includes a first data conversion circuit configured to
set a value obtained by multiplying the intensity coefficient by the value of the image data indicating red, the value of the image data indicating green and the value of the image data indicating blue as the first color conversion data in the case where a value of image data showing the highest luminosity is the value of the image data indicating red;

set a value obtained by replacing the value of the image data indicating green and the value of the image data indicating red, the value of the image data indicating green, the value of the image data indicating red and the value of the image data indicating blue as the first color conversion data in the case where a value of image data showing the highest luminosity is the value of the image data indicating green; and set a value obtained by replacing the value of the image data indicating blue and the value of the image data indicating red, the value of the image data indicating blue, the value of the image data indicating green and the value of the image data indicating red as the first color conversion data in the case where a value of image data showing the highest luminosity is the value of the image data indicating blue.

5. The image processing device according to claim 3, wherein the area dedicated color conversion RGB value calculation circuit further includes a second data conversion circuit configured to
set a value obtained by replacing the value of the image data indicating red and the value of the image data indicating blue, and a value obtained by multiplying the luminosity coefficient by each of the value of the image data indicating blue, the value of the image data indicating green and the value of the image data indicating red respectively as the second color conversion data in the case where the relatively large a value of image data showing the highest luminosity is the value of the image data indicating red;

set a value obtained by replacing the image data indicating green and the value of the image data indicating blue, and a value obtained by multiplying the luminosity coefficient by each of the value of the image data indicating red, the image data indicating blue and the value of the image data indicating green respectively as the second color conversion data in the case where a value of image data showing the highest luminosity is the value of the image data indicating green; and set a value obtained by multiplying the intensity coefficient by the image data indicating blue, and a value obtained by multiplying the luminosity coefficient by each of the image data indicating red and the value of the image data indicating green respectively as the second color conversion data in the case where a value of image data showing the highest luminosity is the image data indicating blue.

6. The image processing device according to claim 4, wherein the first data conversion circuit converts at least one value of the image data from the value of the image data indicating red, the value of the image data indicating green and the value of the image data indicating blue to a value of an image data emphasizing a color of a long wavelength.

7. The image processing device according to claim 5, wherein the second data conversion circuit converts at least one value of the image data from the value of the image data indicating red, the value of the image data indicating green and the value of the image data indicating blue to a value of an image data emphasizing a color of a short wavelength.

8. An image processing method comprising:
inputting input data showing an image to an area dividing circuit;
dividing an image into a plurality of blocks by the area dividing circuit;

converting input data showing an image data including color data of image data indicating red, image data indicating green and image data indicating blue by the area dividing circuit;

allocating the image data including the color data to each of the blocks by the area dividing circuit;

outputting data of the blocks as area dividing data by the area dividing circuit;

outputting the image data including the color information allocated to each of the blocks as area dedicated RGB data by the area dividing circuit, outputting the image data including the color information allocated to each of the blocks by the area dividing circuit;

inputting data of the blocks, dividing the blocks into a first image area and a second image area and outputting the divided area data including the first image area and the second image area as focus area judgment data by a focus area judgement circuit;

inputting the area dedicated RGB data and the focus area judgment data, comparing the area dedicated RGB data with the focus area judgment data by an area dedicated color conversion RGB value calculation circuit;

judging whether or not the focus area judgment data is included in either the first image area or the second image area by the area dedicated color conversion RGB value calculation circuit;

calculating first color conversion data obtained by converting the area dedicated RGB data included in the first image area into image data emphasizing a color of a long wavelength from the area dedicated RGB data and an intensity coefficient by the area dedicated color conversion RGB value calculation circuit in the case where the area dedicated RGB data is included in the first image area; and calculating second color conversion data obtained by converting the area dedicated RGB data included in the second image area into image data emphasizing a color of a short wavelength from the area dedicated RGB data, the intensity coefficient and a luminosity coefficient by the area dedicated color conversion RGB value calculation circuit in the case where the image data is included in the second image area;

outputting output data showing an RGB image including the first color conversion data and the second color conversion data by the area dedicated color conversion RGB value calculation circuit; and inputting the output data showing an RGB image from the area dedicated color conversion RGB value calculation circuit, and displaying an image in which tone of the first image area is enhanced more than tone of the second image area by a display device.

9. An image processing method comprising:

inputting input data showing an image to an area dividing circuit;

dividing an image into a plurality of blocks by the area dividing circuit;

converting input data showing an image data including color data of image data indicating red, image data indicating green and image data indicating blue by the area dividing circuit;

allocating the image data including the color data to each of the blocks by the area dividing circuit;

outputting data of the blocks as area dividing data by the area dividing circuit outputting the image data including the color information allocated to each of the blocks as area dedicated RGB data by the area dividing circuit;

outputting the image data including the color information value allocated to each of the blocks by the area dividing circuit;

inputting data of the blocks, dividing the blocks into a first image area and a second image area and outputting the divided area data including the first image area and the second image area as focus area judgment data by a focus area judgement circuit;

inputting the area dedicated RGB data and the focus area judgment data, comparing the area dedicated RGB data with the focus area judgment data by an area dedicated color conversion RGB value calculation circuit;

judging whether or not the focus area judgment data is included in either the first image area or the second image area by the area dedicated color conversion RGB value calculation circuit;

extracting a first value of image data showing the highest luminosity from among the value of the image data indicating blue by the area dedicated color conversion RGB value calculation circuit in the case where the focus area judgment data is included in the first image area;

calculating first color conversion data obtained by converting the area dedicated RGB data included in the first image area into image data emphasizing a color of a long wavelength from the value of the image data indicating red, the value of the image data indicating green and the value of the image data indicating blue and the intensity coefficient;

extracting a second a value of image data showing the highest luminosity from among the value of the image data indicating red, the value of the image data indicating green and the value of the image data indicating blue by the area dedicated color conversion RGB value calculation circuit in the case where the focus area judgment data is included in the second image area; and calculating second color conversion data obtained by converting the area dedicated RGB data included in the second image area into image data emphasizing a color of a short wavelength from the value of the image data indicating red, the value of the image data indicating green and the value of the image data indicating blue, the intensity coefficient and a luminosity coefficient;

outputting output data showing an RGB image including the first color conversion data and the second color conversion data by the area dedicated color conversion RGB value calculation circuit; and inputting the output data showing an RGB image from the area dedicated color conversion RGB value calculation circuit, and displaying an image in which tone of the first image area is enhanced more than tone of the second image area by a display device.

* * * * *